United States Patent Office 2,887,376
Patented May 19, 1959

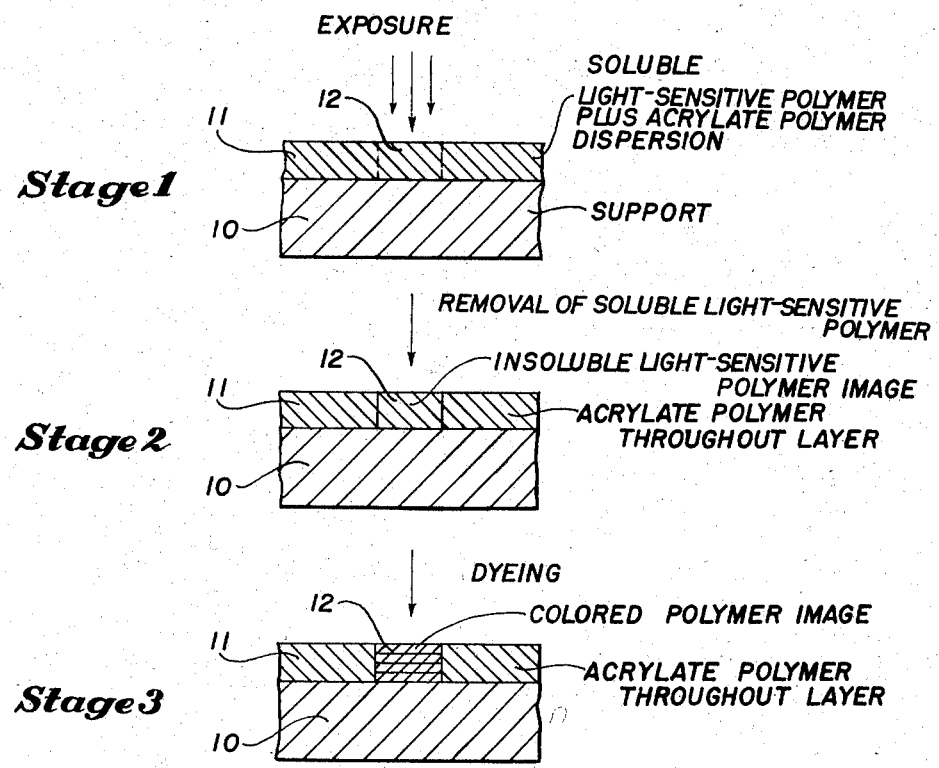

2,887,376
PHOTOGRAPHIC REPRODUCTION PROCESS USING LIGHT-SENSITIVE POLYMERS

Carolyn K. Tupis, Rochester, N.Y., assignor to Eastman Kodak Company, Rochester, N.Y., a corporation of New Jersey Application January 26, 1956, Serial No. 561,462

3 Claims. (Cl. 96—35)

This invention relates to a photographic process utilizing photographic elements containing light-sensitive polymers which have the inherent property of becoming insolubilized upon exposure to light and which are mordants for dyes.

Photographic elements of the invention include a support such as a photographic film base carrying thereon a layer of a mixture of (1) a light-sensitive polymer which in the salt form is soluble in water or in an acid form is soluble in alkaline solutions but which upon exposure to light becomes insolubilized in aqueous or alkaline solutions and (2) an aqueous colloidal dispersion of an essentially hydrophobic alkali insoluble polymer, preferably a soft water-insoluble acrylate resin insoluble in aqueous alkaline solutions.

The process of the invention includes exposing the sensitive elements of the invention under a suitable subject such as a line, halftone or continuous-tone subject for a time sufficient to insolubilize the light-sensitive polymer in the region of exposure. Thereafter the exposed polymeric layer is treated with a solution such as water or aqueous alkaline solution, depending upon the particular light-sensitive polymer used and other factors, with the result that the light-sensitive polymer in the unexposed areas of the coating goes into solution leaving an image of insolubilized light-sensitive polymer in the exposed area disposed in a uniform layer of the acrylate polymer. Thereafter the insoluble light-sensitive polymer image is dyed with dyes such as acid or basic dyes depending upon the nature of the light-sensitive polymer used to produce a visible image.

The application of my photographic elements and processes to color photography will now be apparent. That is, it has been found that when the mentioned insoluble polymer image disposed in the polymer layer is dyed, the dye has a remarkable affinity for the insoluble polymer image and even in the case of very dilute dye baths, the polymer image becomes highly colored and the dye bath is noticeably depleted. Furthermore, the dye in thus becoming mordanted to the polymer image has no tendency to wander, therefore does not color adjacent colloid layers. This is partly due to the fact that the acrylate layer containing the dye image when dried down becomes impervious to aqueous solutions and no further dye can be mordanted onto the insoluble polymer image. Accordingly, the light-sensitive compositions contain sufficient of the acrylate polymer dispersions to confer the mentioned hydrophobic properties to the layer, yet not so little light-sensitive polymer that the light sensitivity is below useful levels and weakly colored images are obtained. The proper proportions are readily found by simple experiment using various amounts of the particular light-sensitive polymer and polymer dispersion.

Accordingly, after the formation in the acrylate layer of a first dye image as described above, such as a cyan-dyed image corresponding to the red color-separation aspect of a colored subject, a second layer of a mixture of the same or a different light-sensitive polymer and the same or a different acrylate polymer dispersion is coated over the cyan-colored image. As mentioned, at this point there is no tendency for the cyan-dyed image to diffuse into the new layer and the latter can be exposed under a different color-separation aspect of the subject, processed to remove the unexposed light-sensitive polymer, followed by dyeing, for example, with a magenta dye bath if, for example, the second exposure was made to the green color-separation aspect of the subject. At this point an important feature of my invention becomes evident since it is found that during the second dyeing operation the dye does not penetrate to the acrylate stratum containing the cyan image and color distortion does not result.

In a similar manner, one or more additional light-sensitive resin-acrylate resin layers may be applied to the element containing the cyan and magenta dye images and a third exposure made, for example, to a blue color-separation aspect of the subject followed by removal of the unexposed polymer from the third layer and dyeing subtractively with a yellow dye to obtain a color reproduction in subtractive colors. Again, the yellow dye solution does not penetrate to the underlying layers and cause color distortion.

A procedure known in the art includes forming a colloid relief image such as a gelatin relief image on a support followed by dyeing the relief image, applying one or more other colloid layers thereon, forming a second relief image therein and dyeing the same to a different color to produce a multi-color picture. However, in such processes, separate relief images have been required to obtain an imagewise distribution of the dyes and the procedure is notoriously deficient due to the fact that the dyes tend to wander throughout the various layers and cause color distortion. In my process, due to the strong mordanting action of the light-sensitive polymers and the impervious character of the acrylate layer containing the dye images, no such diffusion of the dyestuffs occurs.

The photographic elements and processes of my invention are illustrated in the accompanying drawing wherein in stage 1 is shown in greatly enlarged cross-sectional view an element having a support 10 on which is disposed the light-sensitive polymeric layer 11 containing a mixture of acrylate polymer and inherently light-sensitive polymer, the element being pictured during the exposure to a subject so as to impress an image in area 12 of layer 11 in the form of an insoluble polymer image corresponding to the light-sensitive polymer which has been insolubilized by exposure to light. After the exposure step, the element is treated with, for example, an aqueous solution to remove the soluble light-sensitive polymer which has not been exposed to light with the result that as shown in stage 2, the layer 11 now contains the insoluble polymer image in area 12, the acrylate polymer remaining throughout the layer. After dyeing the element with an acid or basic dye or other suitable dye, the element appears substantially as shown in stage 3, a colored insoluble polymer image being present in area 12 and acrylate polymer throughout the layer.

A multi-layer multi-colored element prepared as described above by the successive preparation of subtractively colored images in superposed layers would appear substantially as shown in stage 3 except there being present a plurality of dyed images in different areas and strata of the element, each colored image being integral with an otherwise uniform layer of acrylate polymer.

The following light-sensitive polymers are representative of those which may be used in the light-sensitive layers in conjunction with the acrylate polymer dispersions:

*HP1003A.*—Styrene-maleic anhydride polymer ester of p-carboxymethoxy-p'-(β-hydroxyethoxy) chalcone having the recurring units

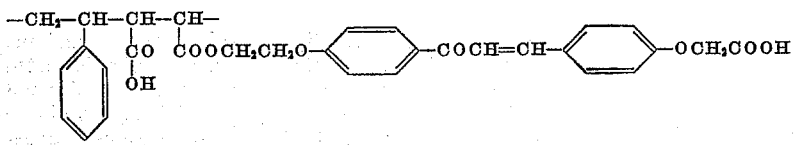

prepared according to Example 10 Unruh et al. U.S. patent application Serial No. 525,367, filed July 29, 1955.

*HP1151A.*—Partially hydrolyzed polyvinyl acetate esterified with 3- and 4-azidophthalic anhydrides and containing the recurring units

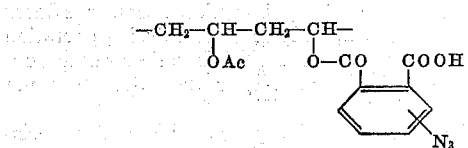

and prepared as described in Example 6 Merrill et al. U.S. patent application Serial No. 525,368, filed July 29, 1955.

*G514–161.*—Styrene-maleic anhydride polymer (1 to 1) esterified with p-(β-hydroxyethoxy)-p'-carboxymethoxy chalcone and containing the recurring units

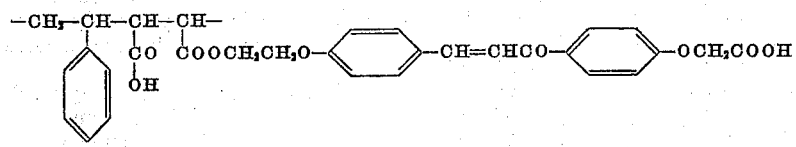

and prepared as follows:

*p-Carboxymethoxyacetophenone.*—A mixture of 227 g. of chloroacetic acid and 272 g. of p-hydroxyacetophenone was melted in a one-liter flask on a hot plate. A solution of 176 g. of sodium hydroxide was added in small portions. The mixture was heated for an hour on a steam bath, then poured into two liters of cold water containing 250 ml. of concentrated hydrochloric acid. When crystallization was complete, the crude product was collected, washed with water, and recrystallized from a mixture of 150 ml. of ethanol and 300 ml. of water. A second recrystallization gave 200 g. of acid, M.P. 169–171°.

*Analysis.*—Calc'd. for $C_{10}H_{10}O_4$: C, 61.7; H, 5.2. Found: C, 61.6; H, 5.3.

*p-(β-Hydroxyethoxy)-p'-carboxymethoxy chalcone.*— Two hundred grams of p-carboxymethoxyacetophenone was dissolved in a warm solution of 48 g. (12 mole) of sodium hydroxide in 1000 ml. of water. A solution of 171 g. of p-(β-hydroxyethoxy)-benzaldehyde in 500 ml. of ethanol was added, and the condensation product was allowed to crystallize at room temperature over a period of three days. The nearly solid cake was centrifuged to remove as much liquid as possible. The salt was added to two liters of water containing 10 ml. of acetic acid and heated until the salt dissolved. After cooling slowly to 40° to prevent crystallization, 80 ml. of concentrated hydrochloric acid was added rapidly with stirring. When completely crystallized, the free acid was collected, washed with water, and recrystallized from 1800 ml. of ethanol to yield 250 g., M.P. 170–171°.

*Analysis.*—Calc'd. for $C_{19}H_{18}O_6$: C, 66.7; H, 5.3. Found: C, 66.8; H, 5.8.

This product was then reacted with a styrene-maleic anhydride copolymer in pyridine.

*H411–117.*—Isopropenyl acetate-maleic anhydride copolymer esterified with p-(β-hydroxyethoxy)-p'-carboxymethoxy chalcone.

This polymer is prepared as G514–161 just above, except using a isopropenyl acetate copolymer made as follows:

To a solution of 100 g. (1 mole) of distilled isopropenyl acetate and 98 g. (1 mole) of maleic anhydride in 120 ml. of acetone was added 0.5 ml. of 30 percent hydrogen peroxide. The solution was refluxed on a steam bath for 4 hours and then diluted with 850 ml. of acetone and precipitated into approximately 20 l. of benzene. The polymer was collected, leached with benzene, and dried at room temperature. Yield, 116 g. (58.6 percent). {η} in acetone was 0.68.

*H411–124.*—Styrene-itaconic anhydride copolymer esterified with p-(β-hydroxyethoxy)-p'-carboxymethoxy chalcone prepared as G514–161 above except using an itaconic anhydride copolymer.

*G527 – 92ABM.*—Poly-1-methyl-5-vinyl-2-stilbazolium methosulfate containing recurring units having the structure

and prepared as described in Example 5 of Leubner et al. U.S. Patent application Serial No. 534,598, filed September 15, 1955.

*G527–191B.* — Poly-4'-methoxy-1-methyl-5-vinyl-2-stilbazolium methosulfate (Example 14 of the invention of Leubner et al. just above).

Other alkali-soluble polymers and polymers salts disclosed in the just-mentioned inventions as well as those disclosed in the Unruh et al. U.S. patent application Serial No. 511,417, filed May 26, 1955, now Patent No. 2,824,084, may be used in the light-sensitive layers in conjunction with the hydrophobic polymer dispersions.

Aqueous anionic copolymer dispersions having the following compositions are representative of those which can be employed with the light-sensitive polymers particularly the acidic polymers.

*OR10256F.* — 25% acrylonitrile — 75% ethylacrylate copolymer (50% solids).

Thirty pounds of distilled water were heated with steam in a 13-gallon stainless-steel vessel to 80° C. Then 92 grams of potassium persulfate, 208 grams of saponin, and 688 grams of Triton 771 a 20% isopropanol solution of an alkyl aryl polyether sulfonate were added with mechanical agitation. While maintaining the liquid temperature at 80° C. and stirring, a mixture consisting of 25 pounds of freshly distilled ethyl acrylate and 8 pounds 5 ounces of freshly distilled acrylonitrile was added dropwise through one dropping funnel and a solution containing 688 grams of additional Triton 771 solution diluted with 0.3 pound of distilled water was added simultaneously through another dropping funnel. The additions required two hours; heating with stirring was continued for an additional 0.25 hour. The temperature of the hydrosol was reduced to that of the room and the pH, 4.0 at the end of the reaction, adjusted to 6.0 by addition of dilute aqueous sodium hydroxide solution. The sol was then subjected to water-pump vacuum for several hours to remove a small amount of unpolymerized monomers.

*HP678D.*—35% butylacrylate–65% styrene copolymer (2% solids).

Eight hundred ml. of hot tap water, containing 2.5 grams of DuPonol-ME surfactant (sodium lauryl sulfate) and 1.0 gram of potassium persulfate were placed in a 2-liter, 3-necked round bottom flask equipped with mechanical stirrer, two dropping funnels, and a thermometer set to measure liquid temperature on a steam bath and internal temperature raised to 80° C. While maintaining the temperature at this value and stirring, a mixture consisting of 165 grams of styrene and 89 grams of n-butylacrylate was added dropwise through one funnel and a solution of 2.5 grams of additional DuPonol-ME in 200 ml. hot tap water was added dropwise through the other funnel. The additions required about 45 minutes. After maintaining internal temperature at this level the hydrosol was cooked for an additional 15 minutes.

Dispersions of the following homopolymers and copolymers prepared in a similar manner are also useful with the acidic light-sensitive polymers 1. Polyvinylacetate.
2. 10% acrylonitrile, 90% ethylacrylate
3. 50% ethylacrylate, 50% styrene, 40% solids
4. 16% methylacrylamide, 84% n-butylacrylate, 20% solids
5. 16% methacrylamide, 84% (70% isobutylacrylate, 30% styrene), 20% solids
6. 45% butadiene, 55% styrene, 45% solids
7. 75% butadiene, 25% styrene, 45% solids
8. 23% N-isopropyl acrylamide, 77% (82% n-butylacrylate, 18% acrylonitrile), 20% solids
9. n-Butylacrylate
10. 50% n-butylacrylate, 50% acrylonitrile
11. 30% ethylacrylate, 30% acrylonitrile, 40% acrylic acid
12. 42.5% ethylacrylate, 42.5% acrylonitrile, 15% acrylic acid
13. 20% solids, 16% methacrylamide, 84% (50% ethylmethacrylate–50% styrene)

Aqueous cationic acrylate polymer dispersions useful with the quaternary polymers such as G527–92ABM above are as follows:

(Aerosol SE cationic surfactant i.e. stearamidopropyl dimethyl-β-hydroxyethylammonium chloride, present in each)

HP1279D—Copolymer 75% ethylacrylate–25% acrylonitrile (40% solids)
HP1276A—40% solids, copolymer of 4% vinyl pyridine–96%) n-butylacrylate—50%, acrylonitrile—50%)
HP1276C—As HP1276A but 96% (ethylacrylate 95%, acrylonitrile 5%)
HP1276D—As HP1276A but 96% (ethylacrylate 75%, acrylonitrile 25%)
G528–104A—As HP1276A but 96% (ethylacrylate 75%, acrylonitrile 25%)
HP12790—40% solids dispersion of copolymer 75% ethylacrylate, 25%
HP1307B—20% solids dispersion (butyl acrylate 70% acrylonitrile 30%)

Representative dyes useful alone or in combination for dyeing the insoluble polymer images are the following (the basic dyes are preferred for use with those systems employing the acidic light-sensitives polymers such as polymers HP1003A, HP1151A, G514–161, H411–117 and H411–124 above, and the acid dyes with polymers mordanting acid dyes such as G527–92ABM and G527–191B polymer above.

Dyes for acid polymers: | [1] Schultz number
--- | ---
Rhodamine B ExS (GDC) | 864
Acridine Yellow (Hoechst) | 901
Capribleu GON (Leonhardt) | 991
Rosaniline hydrochloride | 779
Rhodamin G Chloride | 865
Astra Phloxine FF, extra high concentration (GDC) | 930
Fuchsine (NAC) | 780
Malachite Green | 754
Rhoduline Blue 6GA | 755
Thioflavine T (Cassella) | 934
Auramine O | 752
Acridine Yellow | 901
Acriflavine Hydrochloride | 906
Calco Nigrosine SSJ (spirit soluble) | 985
Durol Black | 594
Chrysoidine (teakwood) | 27
Rheonine AL (I.G.F.A.) | 911
Methylene Blue Chloride (NAC) | 1038
Phenosafranin (NAC) | 958
Aurophosphine 4G | 905

Dyes for quaternary polymers:

| | |
--- | ---
Sulphon Black A | 593
Acid Black | 299
National Durol Black 2B | 954
Nerol 2B (I.G.F.A.) | 590
Durol Black B (N.A.C.) | 594
Nerol B | 591
Nigrosine | 986

[1] Schultz-Lehman: Farbstofftabellen, 7th edition, 1931.

The following specific examples illustrate the photographic elements and processes of use in making colored reproductions.

*Example 1*

A coating composition was prepared as follows:

Part A:
Polymer HP1003A _____grams__ 7
Water _____cc__ 95
Ammonia (28% solution) _____cc__ 5
Part B: Acrylate polymer disp. (OR10256F).

Six cc. of A and 10 cc. of B were mixed with vigorous stirring and coated upon a baryta coated paper support which had been waterproofed with part B. The coating was exposed under a negative until the light-sensitive polymer component of the coating had become insoluble in alkaline solution in the exposed area. The sample was then bathed in 1% ammonia solution at 75° F. for 15 minutes, rinsed briefly in water and dyed for 10 minutes in a solution containing 0.1 gram of Rhodamine B ExS (GDC) in 200 cc. of water, rinsed and dried.

A very sharp magenta image was presented in the region of exposure.

*Example 2*

The coating composition of Example 1 was used throughout. First, a coating was made exactly as in Example 1 except that the exposure was made under the blue filter negative of a 200-line halftone color separation. This coating was dyed in a solution of 0.1 gram Acridine Yellow (Hoechst) in 200 cc. of water. After rinsing and drying, it was coated with the light-sensitive composition again just as though it were a blank piece of paper. This was then exposed under the green filter negative, taking care to obtain good register with the yellow image, and processed and dyed in the magenta bath of Example 1.

A third coating was applied and in turn exposed under the red filter negative and dyed in a solution of 0.1 gram Capribleu GON (Leonhardt) in 200 cc. water.

The result was a color print of high quality.

Example 3

A 5 cc. portion of a solution of 7 grams of a vinyl acetate-vinyl-3(4)-azido-phthalate polymer HP1151A (obtained by the esterification of partially hydrolyzed vinyl acetate with a mixture of 3- and 4-azidophthalic acid anhydrides) in a solution of 10 cc. of 28 percent ammonium hydroxide and 90 cc. of water was mixed with 10 cc. of a 40 percent aqueous dispersion of a 25 percent acrylonitrile-75 percent ethyl acrylate copolymer (HP10256F above) and 10 cc. of dispersing agent was coated onto a thin cellulose acetate sheet. After exposure under a continuous-tone negative, the sheet was bathed for 15 minutes in a 1 percent ammonium hydroxide solution, rinsed and dyed with a 0.05 percent aqueous solution of Rhodamine B ExS (GDC). It was found that the dye took only in the exposed areas of the sheet, partly because the unexposed azide polymer in the other areas had been removed in the washing step.

Example 4

To 5 cc. of the ammonia solution of the azide polymer mixed with 10 cc. of the copolymer dispersion prepared as in Example 3 were added 5 cc. of the copolymer dispersion HP678D (above) together with 12 cc. of a dispersing agent and the composition coated and processed as in Example 3. It was found that this composition could be coated on a polystyrene support and the colored image resulting from the process adhered adequately to the support when dry but when wet could be stripped off and transferred to another support such as paper. Accordingly, it was possible thereby to produce several subtractively colored images corresponding to the color-separation aspects of a colored subject, to strip each from its support and superimpose to obtain a full-color reproduction.

In making coatings of a mixture of the light-sensitive acid polymers indicated above and acrylate polymer dispersions, a convenient method is to mix about 10 cc. of the acrylate polymer dispersion with 5 cc. of the photosensitive polymer solution made by dissolving 6 grams of the acid form of the polymer in 100 cc. of water to which has been added 1 gram of sodium carbonate monohydrate. After exposure of the coatings, it is advantageous to develop them in alkaline solutions at elevated temperatures of the order of 130° F. However, it will be found that certain of the light-sensitive polymers, particularly when present in the acrylate polymer layer in the form of their salts, will not require the use of alkaline solutions such as ammonia solution for developing the exposed layers. However, as a general procedure, water alone aids in removal of the light-sensitive polymer which has not been insolubilized during the exposure step.

Example 5

A white pigmented cellulose ester film support was coated on each side with dispersion OR10256F above, then on one side with a mixture of polymer G514–161 and HP1276E acrylate polymer dispersion, the former polymer being present in the salt form. After exposure, the element was developed in water at 130° F. for 1½ minutes with no agitation. Dyeing was carried out for 1½ minutes at 70° F. in a dye bath giving a neutral-colored image as follows:

0.1 gram Nigrosine Jet dissolved in—
  6 cc. methanol
  2 cc. Acriflavine Hydrochloride N.F. (0.1 gram: 15 cc. water)
  1 cc. Rhoduline Blue 6 GA conc. (0.1 gram: 15 cc. water)
  7 cc. water While still wet, the dyed image can be further dyed with one or more dyes to saturation.

Other means of coloring the insoluble light-sensitive polymer images may be employed besides dyeing, for example, lead or other heavy metal salts such as silver salts may be imbibed into the image from aqueous solutions and treatment with sulfide solutions produce metal sulfide images.

Example 6

The preparation of colored images using the quaternary salt polymers mentioned follows:

A solution was prepared containing 3 grams of polymer G527–92ABM in 100 cc. of water. 5 cc. of this solution were mixed with 10 cc. of the cationic acrylate polymer dispersion HP1279D containing 1 cc. of glacial acetic acid to reduce viscosity. The composition was coated onto a cellulose ester film support, exposed, processed with water at elevated temperature and dyed with a solution of one of the acid dyes prescribed above for the quaternary polymers. The dye was found to be mordanted strongly to the insoluble polymer image.

Example 7

A solution was prepared as in Example 6 using polymer G527–191B instead of G527–92ABM. 10 cc. of this solution were mixed with 0.5 cc. Triton X100. This was then added to 10 cc. of the cationic polymer dispersion HP1307B. The composition was coated onto a water resistant paper which had been coated with HP1307B, exposed in a printing box for 12 seconds, processed with water at 80° for 40 seconds and dyed with a solution of acid dyes.

Example 8

A suitably subbed cellulose ester support was coated with dispersion OR10256F followed by a coating of a mixture of equal parts of A. 6 grams of polymer H411–117 or H411–124 in 100 cc. of 1% sodium carbonate solutions.
B. Dispersion OR10256F The coating was exposed and processed at elevated temperature and dyed with basic dye solution as described above.

What I claim is:

1. A light-sensitive composition comprising a mixture of (1) a C-vinylpyridine quaternary salt polymer containing as a substituent on a substantial proportion of the pyridyl nuclei, the grouping

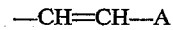

wherein A represents a carbocyclic group containing from 6 to 14 carbon atoms in the nucleus, and (2) an aqueous colloidal dispersion of a soft, water- and alkali-insoluble acrylate polymer.

2. A light-sensitive composition comprising a mixture of (1) a polymer of a 1-methyl-5-vinyl-2-stilbazolium quaternary salt, and (2) an aqueous colloidal dispersion of a soft, water- and alkali-insoluble acrylate polymer.

3. A photographic reproduction process which comprises exposing to a subject a supported layer of a mixture of (1) a C-vinylpyridine quaternary salt polymer containing as a substituent on a substantial proportion of the pyridyl nuclei, the grouping

—CH=CH—A wherein A represents a carbocyclic group containing from 6 to 14 carbon atoms in the nucleus, and (2) an aqueous colloidal dispersion of a soft, water-and alkali-insoluble acrylate polymer, until said first-mentioned polymer has become insolubilized imagewise in the region of exposure, treating the exposed layer with an aqueous solution to remove the polymer from the layer only in the unexposed areas, and coloring the resulting imagewise insolubilized polymer to obtain a colored image.

References Cited in the file of this patent

UNITED STATES PATENTS

| | | |
|---|---|---|
| 654,766 | Selle | July 31, 1900 |
| 2,063,348 | Seymour | Dec. 8, 1936 |
| 2,484,431 | Staehle et al. | Oct. 11, 1949 |
| 2,484,456 | Lowe et al. | Oct. 11, 1949 |
| 2,675,315 | Staehle et al. | Apr. 13, 1954 |
| 2,739,892 | Murray et al. | Mar. 27, 1956 |